Figure 1:
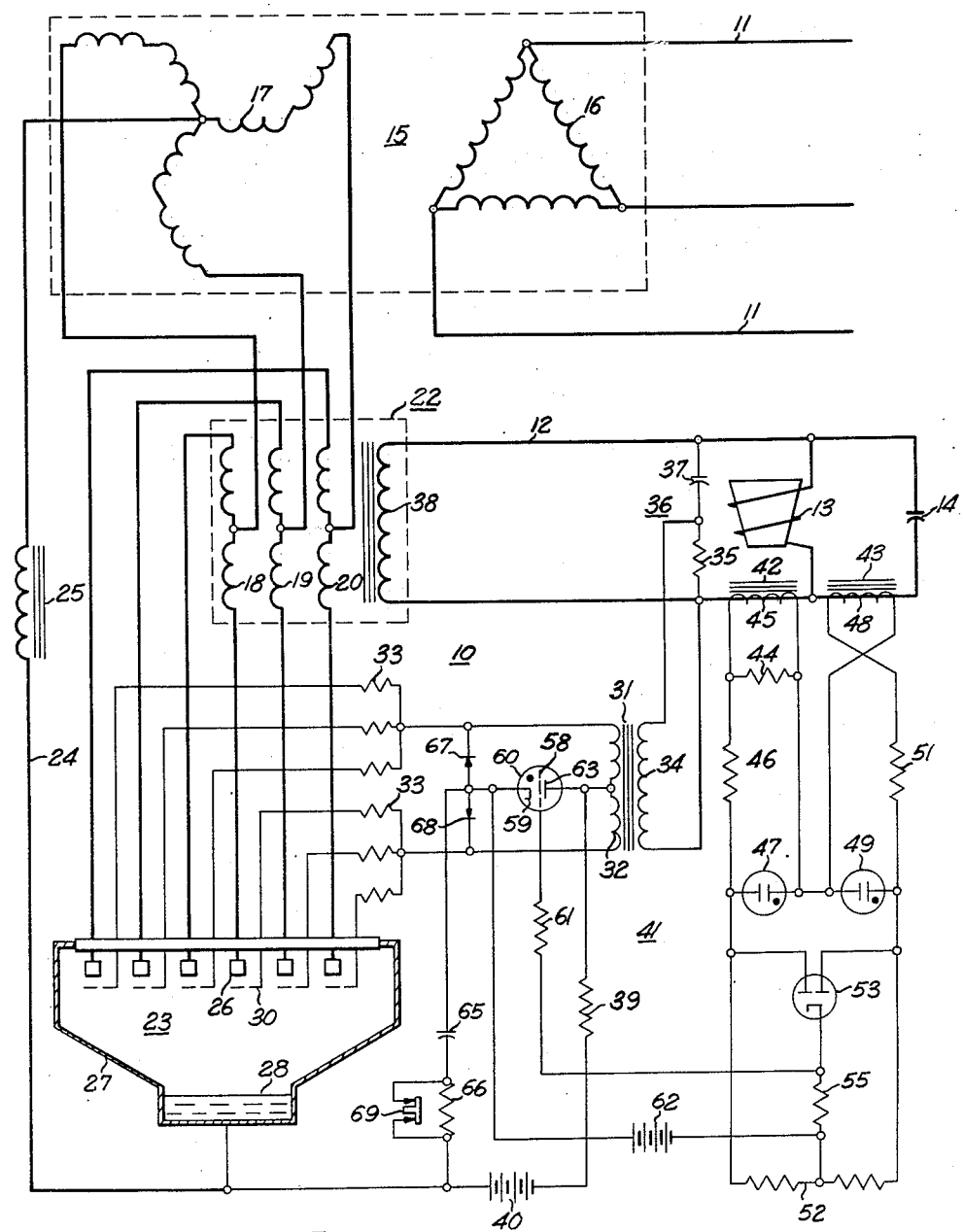

April 10, 1951 A. J. HANSEN 2,548,474
DIFFERENTIAL GRID BLOCKING SYSTEM FOR
ELECTRONIC FREQUENCY CHANGERS
Filed May 31, 1950 2 Sheets-Sheet 2
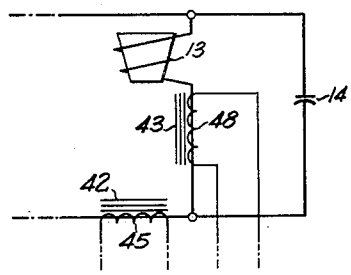
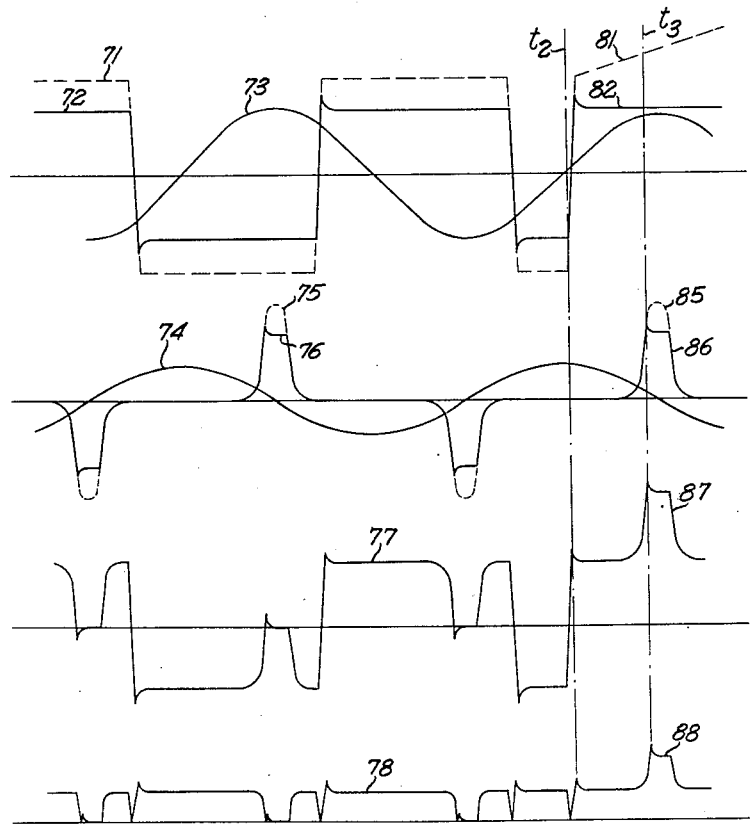
Inventor
Alfred J. Hansen
by John Stevens Lieb
Attorney Patented Apr. 10, 1951

2,548,474

UNITED STATES PATENT OFFICE 2,548,474

DIFFERENTIAL GRID BLOCKING SYSTEM FOR ELECTRONIC FREQUENCY CHANGERS

Alfred J. Hansen, Wauwatosa, Wis., assignor to Allis-Chalmers Manufacturing Company, Milwaukee, Wis.

Application May 31, 1950, Serial No. 165,211

21 Claims. (Cl. 321—66)

This invention relates generally to means for controlling fault currents in electric valve converting systems and particularly to means for interrupting the flow of fault currents in self-excited frequency changers comprising electric valves of the discontinuously controllable type.

In electronic frequency changers of this class, alternating current of a commercial frequency such as 60 cycles per second is converted into direct current, which itself is then inverted into alternating current generally of a higher frequency such as 1000 cycles per second. This kind of frequency changer is useful in supplying high frequency currents to coreless induction furnaces.

Since a self-excited frequency changer, using suitable vapor tubes provided with control grids, acts both as a rectifying device and as an inverting device, it is subject to the fault currents characteristic of the latter device. The most frequently occurring fault in the electronic valve type of inverter is the arc-through. This may be defined as a flow of current in the forward direction through the valve from the anode to the cathode during the scheduled nonconducting period of the anode. It occurs when the control grid associated with the anode fails to block the anode during a scheduled nonconducting period, or when an anode fails to pick up current when scheduled.

Because an arc-through represents an undesirable short circuit current which, if unchecked, will rise to destructively high values, it is necessary to provide some protective means for the frequency changer which will detect a fault as soon as it occurs and apply a negative blocking potential to the control grids of the valves to effect an interruption of the flow of fault current. It is essential that this protective means not react to transient or overload currents, and it is desirable that it be responsive within less than half a cycle of the high frequency circuit to the flow of fault current through the valves.

When an arc-through takes place in the valves of a self-excited frequency changer feeding a combined inductive and capacitive load, the current supplied to the high frequency circuit abruptly changes polarity, while the current in the capacitive branch of the load remains substantially unaffected. By utilizing this phenomenon in a fault protective means, it is possible to derive a first voltage component which is responsive to the polarity of the current supplied to the load. If this first voltage component is then compared with a second voltage component which is responsive to the alternating current flowing in either the capacitive or inductive branch of the load, the resultant voltage may be utilized to actuate a grid blocking circuit.

Grid blocking by this means has the advantage of being simple, fast, and reliable. Moreover, since almost any kind of fault in a self-excited frequency changer of the character described develops into an arc-through, the fault protection system herein envisioned, also gives positive protection for arc-backs, which may be defined as a flow of current in a reverse direction through the valve due to the formation of a cathode spot on an anode. In other words the present invention provides an improved fault protective system for an electric valve frequency changer which blocks the valves if, and only if, an anode is carrying current at a time when it is supposed to be at a positive potential with respect to the cathode, and non-conducting. Under such circumstances neither overload nor transient currents other than fault currents, can actuate the fault protective means.

It is therefore an object of the present invention to provide an improved protective system for an electric valve frequency changer which can detect a fault current within half a cycle of the load frequency after the occurrence of a fault in the valves of the frequency changer.

Another object of the invention is to provide an improved protective system for an electric valve frequency changer which can apply a blocking potential to the control grids of the frequency changer within half a cycle of the load frequency following initiation of a fault in the valves of the frequency changer.

Another object of the invention is to provide an improved protective system for an electric valve frequency changer which can discriminate between fault currents on the one hand, and normal overload and transient currents on the other hand.

Another object of the invention is the provision of an improved protective system for an electric valve frequency changer which is capable of short circuiting the grid transformer of the frequency changer following the initiation of a fault in the valves.

Another object of the invention is the provision of an improved protective system for an electric valve frequency changer which can remove the source of excitation voltage from the control electrodes at the instant of the application of a blocking potential to the same electrodes following a fault in the valves.

Objects and advantages other than those set forth will be apparent from the following description when read together with the accompanying drawings, in which:

Fig. 1 illustrates schematically an embodiment of the present invention associated with an electric frequency changer which converts low frequency current in a supply circuit into high frequency current in a load circuit, and in which fault control means are coupled with the load circuit and with a capacitive branch of the load circuit for applying a blocking potential to the control electrodes of the frequency changer;

Fig. 2 illustrates schematically the wave forms of the various voltages and currents in the system before and after the occurrence of a fault; and Fig. 3 illustrates schematically a portion of another embodiment of the present invention in which the fault control means is coupled with the inductive branch of the load circuit.

In Fig. 1 a frequency changer 10 is shown interconnecting an alternating current supply circuit 11 and an alternating current load circuit 12. The supply circuit 11 is energized from a suitable alternating current power source, not shown. The frequency changer 10 operates to convert the alternating current of a relatively low frequency, such as 60 cycles per second, in the supply circuit 11, into an alternating current of a relatively higher frequency, such as 1000 cycles per second, in the load circuit 12. Although Fig. 1 illustrates, as a preferred embodiment, a frequency changer interconnecting a three phase and a single phase system, the type of frequency changer illustrated is also capable of interconnecting any $n$-phase system with any other $n$-phase system (where $n$ is equal to, or greater than 1). The upper conversion frequency is limited only by the deionization time of the valves.

The high frequency or load circuit 12 is shown connected to a coreless induction furnace whose winding 13 provides the inductive load. A capacitor 14 in parallel with the winding 13 provides the capacitive load. The constants of the inductive and capacitive loads are so adjusted that the combined load has a capacitive character for supplying commutating current to the frequency changer.

The frequency changer comprises an input or low frequency rectifier transformer 15, which has a delta-connected alternating current winding 16 fed by the three phase supply circuit 11, and a zigzag-connected direct current winding 17 for preventing direct current polarization of the transformer core when direct currents flow through the winding. However, any other type of winding connection which will give the desired result may be employed, such as a Y—Y connection with a closed delta tertiary winding.

The terminals of the zigzag winding 17 of the rectifier transformer 15 are severally connected with midtaps of the direct current windings 18, 19, 20 of an output or high frequency inverter transformer 22. The terminals of the direct current windings 18, 19, 20 in turn are connected, through a plurality of electric valves 23 of the discontinuously controllable type, with the neutral point of the zigzag winding 17 to form the direct current circuit 24 of the frequency changer 10. A reactor 25 is inserted in the direct current circuit 24 for smoothing the flow of current through the direct current circuit and for limiting the rate of rise of fault current should a fault occur in one or more of the valves 23.

The electric valves 23 have the usual anodes 26 which may be arranged, as shown, in a single casing 27 with a single cathode 28 of a vaporizable material, such as mercury. As an alternative construction, the valves may have their anodes arranged in individual casings, each with a separate cathode. In either arrangement, ignition means, not shown, are provided for initiating, and for sustaining, at least for the period of emissivity, electron emission from the cathode.

The conductivity of the electric valves 23 is controlled by means of suitable control electrodes 30, which may be grids if the continuously emissive type of cathode is used. When grids are provided, the density of ionization in the region of the anodes 26 is controlled by the grids during the scheduled non-conducting periods in order to prevent conduction during those periods. Although Fig. 1 shows only one grid 30 associated with each anode 26, additional grids may be provided if desired.

The grids 30 may be energized in two groups of three from a suitable coupling means or grid transformer 31 having its secondary winding 32 connected to the grids 30 through current limiting resistors 33 of such low ohmic value as not to materially impede the flow of inverse current in the grid circuits. The resistors 33 have also the function of equalizing the currents between the sets of grids 26. The grid transformer 31 has its primary winding 34 connected across a resistor 35 of a phase shift circuit 36; the phase shift circuit 36 comprising the resistor 35 and a capacitor 37 serially connected across the alternating current winding 38 of the inverter transformer.

Bias voltage for the grids 30 is furnished from a suitable source of direct current, such as a battery 40, having one terminal connected to the cathode 28 of the valves 23 and the other terminal connected through a current limiting resistor 39 to a midtap of the secondary winding 32 of the grid transformer 31.

Means 41 for blocking the valves 23 in response to a flow in the valves of fault currents, such as arc-throughs, comprises a first current transformer 42 having its primary winding serially connected in the load circuit 12, and a second current transformer 43 having its primary winding serially connected with the capacitor 14.

An alternative way of connecting the transformer 43 in the load circuit 12 is shown in Fig. 3, in which the transformer 43 has its primary winding serially connected with the inductor 13. It will be noted that when the transformer 43 is connected in the circuit of the inductor 13, the polarity of the secondary winding 48 is reversed to compensate for the lagging current through the inductor.

An impedance load, such as a resistor 44, is connected across the secondary winding 45 of the first current transformer 42. Connected in parallel with the resistor 44, through a current limiting resistor 46, is a constant voltage discharge device, such as a glow tube 47. The second current transformer 43 has its secondary winding 48 similarly loaded by a second glow tube 49. A resistor 51 is inserted between the secondary winding 48 and the glow tube 49 to limit the flow of current through the tube.

Means is provided for serially connecting together the two tubes 47, 49 so that the voltages appearing across the tubes may be added at every instant to derive a resultant voltage which may be utilized to effect blocking of the control electrodes 26 of the valves 23. Means for rectifying this resultant voltage comprises a voltage divider 52 which is connected in parallel with the tubes 47, 49, and a full wave rectifier 53, comprising a cathode connected through a resistor 55 to a midtap of the voltage divider 52, and a pair of anodes respectively connected to the terminals of the voltage divider 52.

The resistor 55 provides a means for obtaining a voltage drop which can be applied between a grid 58 and cathode 59 of a three element tube 60, preferably of the thyratron type, associated with the grid transformer 31. A resistor 61 is inserted in the grid circuit of the tube 60 to limit the flow of grid current, and a battery 62 is inserted in the same circuit to provide the necessary bias potential for the grid 58.

The tube 60 has a plate 63 connected with a midtap of the secondary winding 32 of the grid transformer 31. The cathode 59 of tube 60 is connected with one side of a blocking capacitor 65; the other side of the blocking capacitor 65 being connected through a resistor 66 to the cathode 28 of the valves 23. Two rectifiers 67, 68, in series, shunt the secondary winding 32 of the grid transformer 31, and have a common connection to the cathode 59 of the tube 60 to complete the circuit of the blocking means 41. A pushbutton switch 69, normally closed, inserts the resistor 66 in the capacitor circuit 65 when the button is depressed. The function of the resistor 66 will hereinafter be explained following an explanation of the operation of the blocking means 41.

In order to start the frequency changer 10, some means such as that described in U. S. Patent No. 2,433,563, Johnson, December 30, 1947, or other suitable starting means (not shown), must be provided.

After the frequency changer 10 has been started, it operates with a leading power factor in the load circuit 12. In the D. C. circuit 24, the direct current is conducted by each phase of the rectifier transformer direct current winding 17 during approximately one-third of a cycle of the low frequency voltage. During that interval, one direct current winding, e. g. 18, of the inverter transformer 22, and the two electric valves connected therewith operate as a single phase inverter, and the current flows alternately through the two parts of the winding for half cycle periods of the high frequency voltage. The normal sequence of commutation or firing of the electric valves is controlled by the proper application of potential to the grids 30.

The control grids 30 thus determine the instants of arc ignition in the electric valves 23 for the normal sequence of commutation and prevent reignition of the arc at unscheduled periods in the anode voltage cycle.

When the frequency changer 10 is operating, the phase shift circuit 36 impresses an alternating control potential on the grids 30 through the grid transformer 31. This same control potential is also rectified through a full wave single phase rectifier comprising the rectifiers 67, 68 to cause a unidirectional current to flow through the circuit comprising the capacitor 65 for charging the capacitor. The current flow through the capacitor circuit is in a direction proceeding from the midtap of winding 32 through the resistor 39, battery 40, pushbutton 69, capacitor 65; and through rectifiers 67 and 68 in alternate half cycles of the high frequency wave to the terminals of winding 32.

Capacitor 65 is known as the grid blocking capacitor, since by transferring the negative charge stored on it to the grids 30 upon release of the tube 60, it is in a position to block the valves 23.

During normal operation of the frequency changer 10, an alternating current of substantially rectangular wave form flows in the load circuit 12.

A voltage component, in response to this load current, but of opposite polarity, will appear across the resistor 44, as shown at 71 in Fig. 2. This voltage component is larger than the firing voltage of the glow tube 47. The voltage across the glow tube 47, therefore, is clipped by the tube 47 to limit its amplitude to a predetermined amount, as shown at 72 in Fig. 2. The magnitude of the voltage across the tube 47 is constant and independent of the magnitude of the line current.

The load circuit high frequency voltage is shown at 73 in Fig. 2. Leading this voltage by almost 90 degrees is the load capacitor current 74.

A second voltage component, in response to the current flowing in the capacitive load 14, will appear across the secondary winding 48 of the current transformer 43. This second voltage component is peaked by any suitable peaking means, as by providing a core for the second current transformer 43 which oversaturates at normal loads. The wave form of the peaked voltage component from the current transformer 43 is shown at 75 in Fig. 2. The glow tube 49 clips this voltage component to a predetermined amplitude, as shown at 76.

It will be noted upon referring to Fig. 2 that the peaked wave 76 occurs when the load circuit voltage 73 is substantially a maximum, and that the peaked wave 76 has a polarity wholly opposed to that of the first voltage component 72. The peaked wave 76 must be caused to occur in each half cycle of the high frequency voltage before the next commutation takes place. In this way, the polarities of the two waves 72, 76 will always be wholly opposed during normal current flow through the valves, and a wave formed by combining the two can never exceed in amplitude the amplitude of either wave alone.

Since the glow tubes 47, 49 are serially connected, the individual voltage components appearing across the glow tubes will be combined to give a resultant voltage as depicted at 77 in Fig. 2. This resultant voltage is rectified by the rectifier 53 and applied across resistor 55. The wave shape of the rectified resultant voltage is shown at 78 in Fig. 2. The voltage appearing across resistor 55 is impressed between the grid 58 and cathode 59 of the three element tube 60 so as to impress a positive potential on the grid 58. The bias voltage of the battery 62 in the grid circuit 58 is so selected, however, that its value is just slightly in excess of the amplitude of the voltage appearing across the resistor 55 in response to normal current flow in the high frequency circuit 12. Under such circumstances the grid 58 of the tube 60 will carry a predetermined negative blocking potential and the tube 60 will not be released to apply the negative charge from the capacitor 65 to the control electrodes 30 of the valves 23. The frequency changer 10 will, therefore, continue to operate without interruption, notwithstanding that a positive rectified voltage is being applied to the grid circuit of the tube 60.

In the event of the induction furnace 13 drawing overload current, or in the event of transient disturbances in the high frequency line 12 due to switching operations and the like, the frequency changer 10 will still continue to operate normally, since the amplitudes of the derived voltage components 72, 76 under such conditions will not substantially differ from the amplitudes experienced under normal current loads, and the rectified voltage 78 applied to the grid 58 will, as usual, be insufficient to release the tube 60.

Occasionally, however, a control grid 30 may fail to block an anode 26 during the scheduled nonconducting period, or an anode may fail to pick up current during its scheduled conducting period. When such an event occurs, the anode in question, which is at a higher potential than the anode which is to normally conduct current, either transfers the current to itself or continues to conduct current. The valves of the frequency changer are then said to experience an arc-through. Since the fault current through the unblocked anode is in the direction of the E. M. F. of the inverter transformer 22 direct current winding, the rise of the current in the D. C. circuit is limited only by the self-inductances of the circuit elements. Since these elements have relatively low self-inductances and since the fault may in all probability repeat itself in subsequent cycles of the load circuit voltage, it is desirable to apply a blocking voltage to all the control grids as quickly as possible, preferably in the first half cycle following the fault. This the blocking means 41 can do.

When a fault occurs, say at time $t_2$ in Fig. 2, the line current in the load circuit 12 suffers an abrupt reversal; in other words it instantly changes polarity. This change in the polarity of the line current will have an effect on the voltage component appearing across resistor 44 and it will also change polarity to appear as shown at 81 in Fig. 2. The glow tube 47, however, will reduce this voltage component to that shown at 82 in Fig. 2. The current through the capacitor 14, however, will remain substantially unaffected by the reversal of the load current, since the capacitor 14 taken together with the inductor 13 form an oscillatory load whose natural frequency is fixed by the value of the load circuit constants. Thus, although the current flowing in the capacitor 14 will be subject to damping at a rate determined by the constants of the load circuit, it will nevertheless remain periodic until damped out. And the load voltage will remain alternating after the fault, as shown at 73 in Fig. 2.

The voltage component across the secondary winding 48 of current transformer 43 will appear as shown at 85 in Fig. 2. When clipped by the tube 49 it will appear as at 86. The net result is that at time $t_3$, as shown in Fig. 2, less than half a cycle after the initiation of the fault, the voltage components appearing across the glow tubes will be of the same polarity instead of opposite polarities, as is the case when the valves 23 are normally conducting. The addition, then, of the two voltage components of like polarity gives a resultant voltage 87 of an amplitude substantially twice the amplitude of either of the rectified voltage components alone. This resultant rectified voltage 88 now has an amplitude greater than the bias voltage of the battery 62 so that a positive unblocking potential is impressed on the grid 58 of the tube 60 to release it. Upon release of the tube 60, the capacitor 65 is connected through the tube 60 to the midtap of the secondary winding 32 of the grid transformer 31. Since the capacitor 65 has previously been negatively charged through the rectifiers 67, 68 by the action of the grid transformer 31 during normal operation of the frequency changer 10, the capacitor 65 is now in a position to impress its negative charge in the form of a negative blocking potential component on the control electrodes 30 of the valves 23.

By becoming conductive to apply a negative blocking potential to the control electrodes 30, the tube 60 effectively short circuits, through the rectifiers 67, 68, the secondary winding of the grid transformer 31. The full wave rectifier circuit connected to the secondary winding 32 and comprising the rectifiers 67, 68, the winding 32, and the tube 60 has its two portions coupled through the tube 60 so that when the tube 60 becomes conductive each portion becomes a closed conducting loop. One portion or loop comprises one half of winding 32, rectifier 67, and tube 60. The other loop comprises the other half of winding 32, rectifier 68, and tube 60. The alternating current voltage supplied by the phase shifting means 36 through the grid transformer 31 to the circuit of control electrodes 30 is thus effectively short circuited through the two loops upon the release of the tube 60.

Stated another way, at the instant the tube 60 is released, the full wave rectifier comprising the rectifiers 67, 68 is short circuited and the E. M. F. previously existing across the winding 32, because of the voltage excitation furnished by the phase shift circuit 36, disappears. Concurrent with the short circuiting of the full wave rectifier, the tube 60 acts as a switch to connect the capacitor 65 to the grids 30 through the winding 32.

Once the control electrodes or grids 30 become negative, the anodes 26 of the valves 23 are respectively blocked as soon as the arc-through current carried by one or more anodes passes through a zero value. The blocking potential supplied by the capacitor 65 is maintained on the grids 30 until all arc-paths are so deionized that they stay blocked by the lower bias potential supplied by the battery 40. Thus, the fault control means can successfully interrupt the flow of fault current by applying a blocking potential to the grids within one half cycle of the high frequency voltage.

Short circuiting the phase shifting means 36 removes the high frequency potential normally applied to the grids 30 and permits the relatively undisturbed application of the blocking potential from the capacitor 65 and the battery 40 to the control electrodes 30 of the valves 23. In this way, the high frequency alternating control potential which persists following the occurrence of a fault will not substantially reduce the value of the blocking potential.

A word might be said here about the function of the resistor 66. Once the frequency changer 10 is in operation, the resistor 66 is short circuited through the switch 69 so that during the period of a fault the internal resistance of the blocking circuit containing the capacitor 65 is as small as possible. The resistor 66 is used only for starting and does not influence the action of the blocking means 41 during a fault. The sole function of resistor 66 is to limit the flow of charging current to the capacitor 65 so as to prevent distortion of the voltage applied to the grids 30 during starting of the valves 23.

Although but two preferred embodiments of the present invention have been herein illustrated and described, and although they have been described particularly in connection with frequency changers comprising electric valves of the discontinuously controllable type it will be apparent to one skilled in the art that the invention may have desirable functional utility in connection with frequency changers comprising other types of electric valves. Moreover, the invention may be useful when applied to other types of circuits not including frequency changers. It should also be understood that the invention of the appended claims is not limited to the exact details of design and construction described herein, for obvious changes and modifications within the scope of the claims will be apparent to those skilled in the art.

It is claimed and desired to secure by Letters Patent:

1. In combination, an alternating current supply circuit, an alternating current load circuit, an inductive load and a capacitive load connected to said load circuit, frequency converting means interconnecting said supply and load circuits comprising a plurality of electric valves having a plurality of control electrodes and at least one cathode, phase shifting means connected with said load circuit for impressing on each said control electrode an alternating control potential component to sustain oscillations in said load circuit, and means responsive to the initiation of a fault in at least one of said valves for impressing a blocking potential on said control electrodes comprising means differentially responsive to the flow of current in said load circuit and to the flow of current in one of said loads.

2. In combination, an alternating current supply circuit, an alternating current load circuit, an inductive load and a capacitive load connected to said load circuit, frequency converting means interconnecting said supply and load circuits comprising a plurality of electric valves having a plurality of control electrodes and at least one cathode, phase shifting means connected with said load circuit for impressing on each said control electrode an alternating control potential component to sustain oscillations in said load circuit, means responsive to the initiation of a fault in at least one of said valves for impressing a blocking potential on said control electrodes comprising means differentially responsive to the flow of current in said load circuit and to the flow of current in one of said loads, and means for effectively short circuiting said phase shifting means simultaneously with the application of said blocking potential to said control electrodes.

3. In combination, an alternating current supply circuit, an alternating current load circuit, an inductive load and a capacitive load connected to said load circuit, frequency converting means interconnecting said supply and load circuits comprising a plurality of electric valves having a plurality of control electrodes and at least one cathode, phase shifting means connected with said load circuit, means connected with said phase shifting means for impressing on each said control electrode an alternating control potential component to sustain oscillations in said load circuit, a source of negative potential, means coupled to said load circuit for deriving a first potential component in response to the current flowing in said load circuit, means coupled to one of said loads for deriving a second potential component in response to the current flowing in said one of said loads, and means responsive to a reversal of the relative polarity of said first and second potential components in response to the initiation of a fault in said valves for connecting said source of negative potential to said control electrodes to block said valves.

4. In combination, an alternating current supply circuit, an alternating current load circuit, an inductive load and a capacitive load connected to said load circuit, frequency converting means interconnecting said supply and load circuits comprising a plurality of electric valves having a plurality of control electrodes and at least one cathode, phase shifting means connected with said load circuit, means connected with said phase shifting circuit for impressing on each said control electrode an alternating control potential component to sustain oscillations in said load circuit, a source of negative potential, means coupled to said load circuit for deriving a first potential component in response to the current flowing in said load circuit, means coupled to one of said loads for deriving a second potential component in response to the current flowing in said one of said loads, means for clipping said first potential component, means for clipping said second potential component, and means responsive to a reversal of the relative polarity of said first and second clipped potential components in response to the initiation of a fault in said valves for connecting said source of negative potential to said control electrodes to block said valves.

5. In combination, an alternating current supply circuit, an alternating current load circuit, an inductive load and a capacitive load connected to said load circuit, frequency converting means interconnecting said supply and load circuits comprising a plurality of electric valves having a plurality of control electrodes and at least one cathode, phase shifting means connected with said load circuit, means connected with said phase shifting circuit for impressing on each said control electrode an alternating control potential component to sustain oscillations in said load circuit, a source of negative potential, means coupled to said load circuit for deriving a first potential component in response to the current flowing in said load circuit, means coupled to one of said loads for deriving a second potential component in response to the current flowing in said one of said loads, means for clipping said first potential component, means for clipping said second potential component, means for comparing said clipped potential components to derive a resultant potential, and means responsive to said resultant potential for connecting said source of negative potential to said control electrodes to block said valves following initiation of a fault in said valves.

6. In combination, an alternating current supply circuit, an alternating current load circuit, an inductive load and a capacitive load connected to said load circuit, frequency converting means interconnecting said supply and load circuits comprising a plurality of electric valves having a plurality of control electrodes and at least one cathode, phase shifting means connected with said load circuit, means connected with said phase shifting means for impressing on each said control electrode an alternating control potential to sustain oscillations in said load circuit, a source of negative potential, means coupled to said load circuit for deriving a first potential component in response to the current flowing in said load circuit, means coupled to one of said loads for deriving a second potential component in response to the current flowing in said one of said loads, means responsive to a reversal of the relative polarity of said first and second potential components in response to the initiation of a fault in said valves for connecting said source of negative potential to said control electrodes to block said valves, and means for effectively short circuiting said phase shifting means simultaneously with the impressing of said negative potential on said control electrodes.

7. In combination, an alternating current supply circuit, an alternating current load circuit, an inductive load and a capacitive load connected to said load circuit, frequency converting means interconnecting said supply and load circuits comprising a plurality of electric valves having a plurality of control electrodes and at least one cathode, phase shifting means connected with said load circuit, means connected with said phase shifting circuit for impressing on each said control electrode an alternating control potential component to sustain oscillations in said load circuit, a source of negative potential, means coupled to said load circuit for deriving a first potential component in response to the current flowing in said load circuit, means coupled to one of said loads for deriving a second potential component in response to the current flowing in said one of said loads, means for clipping said first potential component, means for clipping said second potential component, means for comparing said clipped potential components to derive a resultant component, and means responsive to said resultant component for connecting said source of negative potential to said control electrodes to block said valves following initiation of a fault in said valves, including means for short circuiting said phase shifting means simultaneously with the impressing of said negative potential on said control electrodes.

8. In combination, an alternating current supply circuit, an alternating current load circuit, an inductive load and a capacitive load connected to said load circuit, frequency converting means interconnecting said supply and load circuits comprising a plurality of electric valves having a plurality of control electrodes and at least one cathode, phase shifting means connected with said load circuit, means for coupling said phase shifting means with said control electrodes for impressing on each said control electrode an alternating control potential component to sustain oscillations in said load circuit, capacitor means for storing an electric charge connected to said cathode, means interconnecting said capacitor means and said coupling means responsive to the flow of fault current through said valves for applying a negative potential from said capacitor means to said control electrodes, and means connecting said coupling means and said fault responsive means for bridging said coupling means through said fault responsive means to provide closed conducting loops for said control potential component whereby said control potential is shunted from said control electrodes simultaneously with the application of said negative potential to said control electrodes.

9. In combination, an alternating current supply circuit, an alternating current load circuit, an inductive load and a capacitive load connected to said load circuit, frequency converting means interconnecting said supply and load circuits comprising a plurality of electric valves having a plurality of control electrodes and at least one cathode, phase shifting means connected with said load circuit, transformer means connecting said phase shifting means with said control electrodes for impressing on each said control electrode an alternating control potential component to sustain oscillations in said load circuit, said transformer means including a pair of secondary circuits, and means responsive to the initiation of a fault in said valves for impressing a blocking potential on said control electrodes comprising means differentially responsive to the flow of current in said load circuit and to the flow of current in one of said loads, including electric discharge means for coupling said secondary circuits together to effectively short circuit said phase shifting means.

10. Means for abruptly changing from alternating to unidirectional the voltage applied between the control electrodes and the cathode of an electronic valve comprising a transformer having a primary winding and a secondary winding, a source of alternating voltage, means for connecting said voltage source to said primary winding, said secondary winding comprising a first terminal connected to one of said control electrodes, a second terminal connected to another of said control electrodes, and an intermediate tap, electric discharge means comprising a grid and a pair of principal electrodes, said tap being connected to one of said principal electrodes, a source of negative voltage connected between said cathode and the other of said principal electrodes, means for impressing a positive potential on said grid to cause said discharge means to become conductive for connecting said source of negative voltage between said control electrodes and said cathode, and means cooperating with said discharge means to effectively short circuit said source of alternating voltage upon the connection of said source of said negative voltage beween said control electrodes and said cathode.

11. In combination, an alternating current supply circuit, an alternating current load circuit, frequency converting means interconnecting said supply and load circuits comprising a plurality of electric valves having a plurality of control electrodes and at least one cathode, means for abruptly changing from alternating to unidirectional the voltage applied between the control electrodes and the cathode in response to a change in polarity of the current in the load circuit comprising a transformer having a primary winding and a secondary winding, a phase shifting means having an input circuit and an output circuit, said input circuit being connected to said load circuit and said output circuit being connected to said primary winding of said transformer, said secondary winding comprising a first terminal connected to one of said control electrodes, a second terminal connected to another of said control electrodes, and an intermediate tap, electric discharge means comprising a grid and a pair of principal electrodes, said tap being connected to one of said principal electrodes, a source of negative voltage connected between said cathode and the other of said principal electrodes, means for impressing a positive potential on said grid to cause said discharge means to become conductive for connecting said source of negative voltage between said control electrodes and said cathode, and means cooperating with said discharge means to effectively short circuit said output circuit of said phase shifting means upon connection of said negative voltage source between said control electrodes and said cathode.

12. In combination, an alternating current supply circuit, an alternating current load circuit, an inductive load and a capacitive load connected to said load circuit, frequency converting means interconnecting said supply and load circuits comprising a plurality of electric valves having a plurality of control electrodes and at least one cathode, phase shifting means connected with said load circuit, coupling means connected with said phase shifting means for impressing on each said control electrode an alternating control potential component to sustain oscillations in said load circuit, means responsive to the initiation of a fault in said valves for impressing a blocking potential on said control electrodes comprising means differentially responsive to the flow of current in said load circuit and to the flow of current in one of said loads, said differentially responsive means comprising first transformer means coupled to said load circuit, impedance means connected with said first transformer means for deriving a first voltage component in response to the current flowing in said load circuit, a second transformer means coupled to said one of said loads for deriving a second voltage component in response to the current flowing in said one of said loads, said second transformer means comprising means for peaking said second voltage component, means connected with said impedance means for clipping said first voltage component, means connected with said second transformer means for clipping said second voltage component, means interconnecting said clipping means for comparing said clipped voltage components to effect a resultant voltage, means for rectifying said resultant voltage to derive a unidirectional voltage of predetermined polarity, electric discharge means having a grid and a pair of principal electrodes, a source of negative potential connected to one of said principal electrodes, said coupling means being connected to the other of said principal electrodes, and means for so impressing said unidirectional voltage between said grid and said one of said principal electrodes as to cause said discharge means to become conductive for connecting said source of negative potential to said control electrodes.

13. In combination, an alternating current supply circuit, an alternating current load circuit, an inductive load and a capacitive load connected to said load circuit, frequency converting means interconnecting said supply and load circuits comprising a plurality of electric valves having a plurality of control electrodes and at least one cathode, phase shifting means connected with said load circuit, coupling means connected with said phase shifting means for impressing on each said control electrode an alternating control potential component to sustain oscillations in said load circuit, means responsive to the initiation of a fault in said valves for impressing a blocking potential on said control electrodes comprising means differentially responsive to the flow of current in said load circuit and to the flow of current in one of said loads, said differentially responsive means comprising first transformer means coupled to said load circuit, impedance means connected with said first transformer means for deriving a first voltage component in response to the current flowing in said load circuit, a second transformer means coupled to said one of said loads for deriving a second voltage component in response to the current flowing in said one of said loads, said second transformer means comprising means for peaking said second voltage component, means connected with said impedance means for clipping said first voltage component, means connected with said impedance means for clipping said first voltage component, means connected with said second transformer means for clipping said second voltage component, means interconnecting said clipping means for comparing said clipped voltage components to effect a resultant voltage, means for rectifying said resultant voltage to derive a unidirectional voltage of predetermined polarity, electric discharge means having a grid and a pair of principal electrodes, a source of negative potential connected to one of said principal electrodes, said coupling means being connected to the other of said principal electrodes, means for so impressing said unidirectional voltage between said grid and said one of said principal electrodes as to cause said discharge means to become conductive for connecting said source of negative potential to said control electrodes, and means for effectively short circuiting said phase shifting means simultaneously with the connection of said negative potential source with said control electrodes.

14. In combination, an alternating current supply circuit, an alternating current load circuit, an inductive load and a capacitive load connected to said load circuit, frequency converting means interconnecting said supply and load circuits comprising a plurality of electric valves having a plurality of control electrodes and at least one cathode, phase shifting means connected with said load circuit, means connected with said phase shifting means for impressing on each said control electrode an alternating control potential component to sustain oscillations in said load circuit, a source of negative potential, means coupled to said load circuit for deriving a first potential component in response to the current flowing in said load circuit, means coupled to said capacitive load for deriving a second potential component in response to the current flowing in one of said loads including means for peaking said second potential component, and means responsive to a reversal of the relative polarity of said first and second potential components in response to the initiation of a fault in said valves for connecting said source of negative potential to said control electrodes to block said valves.

15. In combination, an alternating current supply circuit, an alternating current load circuit, an inductive load and a capacitive load connected to said load circuit, frequency converting means interconnecting said supply and load circuits comprising a plurality of electric valves having a plurality of control electrodes and at least one cathode, phase shifting means connected with said load circuit, means connected with said phase shifting means for impressing on each control electrode an alternating control potential component to sustain oscillations in said load circuit, a source of negative potential, means coupled to said load circuit for deriving a first potential component in response to the current flowing in said load circuit, means coupled to one of said loads for deriving a second potential component in response to the current flowing in said one of said loads including means for peaking said second potential component, means responsive to a reversal of the relative polarity of said first and second potential components in response to the initiation of a fault in said valves for connecting said source of negative potential to said control electrodes to block said valves, and means for short circuiting said phase shifting means simultaneously with the impressing of said negative potential on said control electrodes.

16. In combination, an alternating current supply circuit, an alternating current load circuit, an inductive load and a capacitive load connected to said load circuit, frequency converting means interconnecting said supply and load circuits comprising a plurality of electric valves having a plurality of control electrodes and at least one cathode, phase shifting means connected with said load circuit, means connected with said phase shifting circuit for impressing on each said control electrode an alternating control potential component to sustain oscillations in said load circuit, a source of negative potential, means coupled to said load circuit for deriving a first potential component in response to the current flowing in said load circuit, means coupled to one of said loads for deriving a second potential component in response to the current flowing in said one of said loads, including means for peaking said second potential component, means for clipping said first potential component, means for clipping said second potential component, means for comparing said clipped potential components to derive a resultant potential, and means responsive to said resultant potential for connecting said source of negative potential to said control electrodes to block said valves following initiation of a fault in said valves.

17. In combination, an alternating current supply circuit, an alternating current load circuit, an inductive load and a capacitive load connected to said load circuit, frequency converting means interconnecting said supply and load circuits comprising a plurality of electric valves having a plurality of control electrodes and at least one cathode, phase shifting means connected with said load circuit for impressing on each said control electrode an alternating control potential component to sustain oscillations in said load circuit, and means responsive to the initiation of a fault in at least one of said valves for impressing a blocking potential on said control electrodes comprising means differentially responsive to the flow of current in said load circuit and to the flow of current in said capacitive load.

18. In combination, an alternating current supply circuit, an alternating current load circuit, an inductive load and a capacitive load connected to said load circuit, frequency converting means interconnecting said supply and load circuits comprising a plurality of electric valves having a plurality of control electrodes and at least one cathode, phase shifting means connected with said load circuit for impressing on each said control electrode an alternating control potential component to sustain oscillations in said load circuit, and means responsive to the initiation of a fault in at least one of said valves for impressing a blocking potential on said control electrodes comprising means differentially responsive to the flow of current in said load circuit and to the flow of current in said capacitive load.

19. In combination, an alternating current supply circuit, an alternating current load circuit, an inductive load and a capacitive load connected to said load circuit, frequency converting means interconnecting said supply and load circuits comprising a plurality of electric valves having a plurality of control electrodes and at least one cathode, phase shifting means connected with said load circuit for impressing on each said control electrode an alternating control potential component to sustain oscillations in said load circuit, means responsive to the initiation of a fault in at least one of said valves for impressing a blocking potential on said control electrodes comprising means differentially responsive to the flow of current in said load circuit and to the flow of current in said capacitive load, and means for effectively short circuiting said phase shifting means simultaneously with the application of said blocking potential to said control electrodes.

20. In combination, an alternating current supply circuit, an alternating current load circuit, an inductive load and a capacitive load connected to said load circuit, frequency converting means interconnecting said supply and load circuits comprising a plurality of electric valves having a plurality of control electrodes and at least one cathode, phase shifting means connected with said load circuit, means connected with said phase shifting means for impressing on each said control electrode an alternating control potential component to sustain oscillations in said load circuit, a source of negative potential, means coupled to said load circuit for deriving a first potential component in response to the current flowing in said load circuit, means coupled to said capacitive load for deriving a second potential component in response to the current flowing in said capacitive load, and means responsive to a reversal of the relative polarity of said first and second potential components in response to the initiation of a fault in said valves for connecting said source of negative potential to said control electrodes to block said valves.

21. In combination, an alternating current supply circuit, an alternating current load circuit, an inductive load and a capacitive load connected to said load circuit, frequency converting means interconnecting said supply and load circuits comprising a plurality of electric valves having a plurality of control electrodes and at least one cathode, phase shifting means connected with said load circuit, means connected with said phase shifting circuit for impressing on each said control electrode an alternating control potential component to sustain oscillations in said load circuit, a source of negative potential, means coupled to said load circuit for deriving a first potential component in response to the current flowing in said load circuit, means coupled to said capacitive load for deriving a second potential component in response to the current flowing in said capacitive load, means for clipping said first potential component, means for clipping said second potential component, and means responsive to a reversal of the relative polarity of said first and second clipped potential components in response to the initiation of a fault in said valves for connecting said source of negative potential to said control electrodes to block said valves.

ALFRED J. HANSEN.

REFERENCES CITED

The following references are of record in the file of this patent:

UNITED STATES PATENTS

| Number | Name | Date |
|---|---|---|
| 2,399,322 | Carlin | Apr. 30, 1946 |
| 2,490,290 | Winograd | Dec. 6, 1949 |